United States Patent [19]

Kvita et al.

[11] 4,160,081
[45] Jul. 3, 1979

[54] IMIDYL- AND ISOIMIDYL-PHTHALIC ANHYDRIDES, PROCESS FOR THEIR MANUFACTURE AND THEIR USE FOR CURING EPOXIDE RESINS

[75] Inventors: Vratislav Kvita, Muttenz; Roland Darms, Therwil; Gerd Greber, Binningen, all of Switzerland

[73] Assignee: Ciba-Geigy Corporation, Ardsley, N.Y.

[21] Appl. No.: 922,894

[22] Filed: Jul. 10, 1978

Related U.S. Application Data

[62] Division of Ser. No. 707,923, Jul. 22, 1976, Pat. No. 4,131,613, which is a division of Ser. No. 531,030, Dec. 9, 1974, Pat. No. 3,979,393.

[30] Foreign Application Priority Data

Dec. 20, 1973 [CH] Switzerland ............... 17903/73

[51] Int. Cl.² .......................................... C08G 59/42
[52] U.S. Cl. .................................. 528/93; 528/94; 528/114; 528/322; 528/327; 525/507
[58] Field of Search ............... 528/114, 322, 135, 327, 528/93, 94

[56] References Cited

U.S. PATENT DOCUMENTS 3,627,704 12/1971 Moran et al. ............... 260/2 N
3,627,730 12/1971 Moran et al. ............... 260/47 EA
3,725,345 4/1973 Bargain ..................... 260/47 EC Primary Examiner—Earl A. Nielsen
Attorney, Agent, or Firm—Joseph F. DiPrima

[57] ABSTRACT

The invention relates to new imidyl compounds of the formula Ia and isoimidyl compounds of the formula Ib

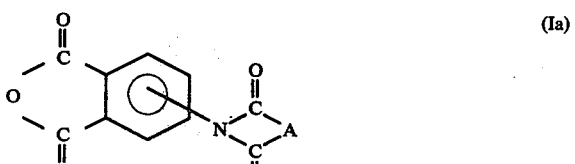

(Ia)

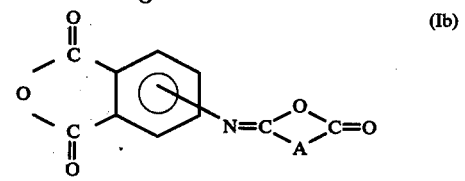

(Ib)

in which A denotes a divalent organic radical, especially an ethenylene, ethylene or propylene group. These compounds serve as curing agents for epoxide resins and give cured products with good mechanical and electrical properties.

3 Claims, No Drawings

IMIDYL- AND ISOIMIDYL-PHTHALIC ANHYDRIDES, PROCESS FOR THEIR MANUFACTURE AND THEIR USE FOR CURING EPOXIDE RESINS

This is a divisional of application Ser. No. 707,923, filed on July 22, 1976, which is a divisional of prior application Ser. No. 531,030, filed on Dec. 9, 1974, now U.S. Pat. No. 3,979,393 now U.S. Pat. No. 4,131,613.

The present invention relates to new imidyl- and isoimidyl- acid anhydrides, a process for their manufacture and their use for curing epoxide resins.

The new imidyl- and isoimidyl-phthalic anhydrides correspond to the formula I

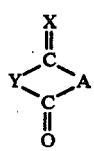

(I)

wherein one of X and Y represents oxygen and the other represents the divalent radical

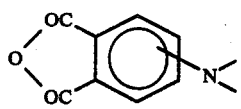

and A represents a divalent radical with 2 to 8 carbon atoms, which optionally contains a carbon-carbon double bond.

The formula I encompasses the following compounds:

Compounds of the formula I, wherein X=oxygen, correspond to the formula Ia

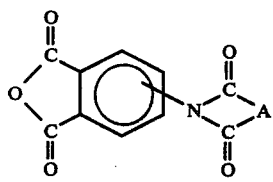

(Ia)

Compounds of the formula I, wherein Y=oxygen, that is to say isoimidyl-phthalic anhydrides, correspond to the formula Ib

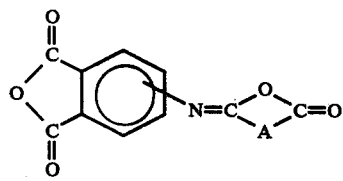

(Ib)

Imidyl- and isoimidyl-phthalic anhydrides of the formula I, wherein A represents a radical of the formula

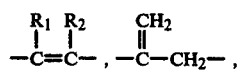

-continued

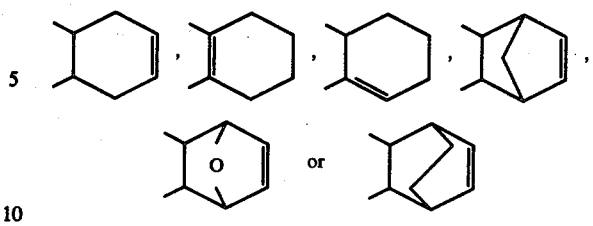

$R_1$ and $R_2$ independently of one another denote hydrogen, chlorine, bromine or methyl and what has been stated above applies to X and Y, are preferred.

If A represents a saturated radical according to the definition, the compounds are in particular imidyl-phthalic anhydrides of the formula I, wherein A represents a radical of the formula

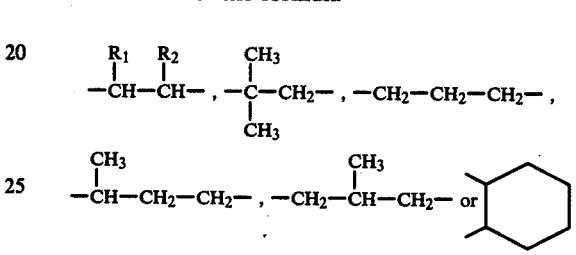

$R_1$ and $R_2$ independently of one another denote hydrogen, chlorine, bromine or methyl, X denotes oxygen and Y denotes the divalent radical of the formula

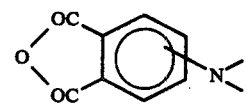

Very particularly preferred compounds are 3- and 4-(maleinimidyl)-phthalic anhydride, 3- and 4-(isomaleinimidyl)-phthalic anhydride and 3- and 4-(succinimidyl)-phthalic anhydride as well as the corresponding, easily accessible isomer mixtures.

The new imidyl- and isoimidyl-phthalic anhydrides of the formula I can be manufactured, according to the invention, by reacting a 3- or 4-aminophthalic acid or a salt thereof, especially an alkali metal salt, and preferably the disodium salt, with an anhydride of the formula II

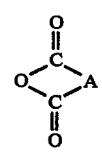

(II)

to give an amidylphthalic acid of the formula III

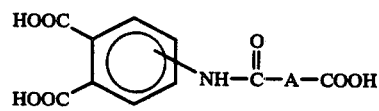

(III)

or its salt, wherein A has the meaning indicated under formula I, and subsequently cyclising the resulting acid, where necessary after converting the resulting salt into the acid. Surprisingly, according to the invention, the simultaneous closing of the anhydride ring and of the imide ring is possible.

The starting products used in the process according to the invention are known.

The aminophthalic acids can be employed as such or in the form of their salts or can be manufactured in situ by reduction of the corresponding nitrophthalic acids and be used further without intermediate isolation. Mixtures of 3- and 4-aminophthalic acid can also be used.

The following may be mentioned as examples of suitable anhydrides of the formula II: maleic anhydride, citraconic anhydride, itaconic anhydride, chloromaleic anhydride, 2,3-dichloromaleic anhydride, 2,3-dibromomaleic anhydride, dimethylmaleic anhydride, 1,2,3,6-, 3,4,5,6- or 1,4,5,6-tetrahydrophthalic anhydride (4-, 1- or 3-cyclohexene-1,2-dicarboxylic acid anhydride), 3,6-endomethylene-1,2,3,6-tetrahydrophthalic anhydride (nadic-anhydride), methyl-3,6-endomethylene-1,2,3,6-tetrahydrophthalic anhydride (methyl-nadicanhydride), 3,6-endoxo-1,2,3,6-tetrahydrophthalic anhydride, bicyclo-[2.2.2]-octa-5-ene-2,3-dicarboxylic acid anhydride, succinic anhydride, methyl-, 2,2-dimethyl-, 2,3-dimethyl-, chloro-, bromo-, 2,3-dichloro- or 2,3-dibromo-succinic anhydride, glutaric anhydride, 2- or 3-methylglutaric anhydride and cis-hexahydrophthalic anhydride.

The reaction of aminophthalic acid with the anhydrides of the formula II can be carried out in the melt by heating the reactants to temperatures of up to about 150° C., or in an aqueous, aqueous-organic or organic medium, the reaction suitably being carried out at temperatures between about 0° C. and 50° C., especially about 15° C. and 25° C. If a salt of aminophthalic acid is used, an acid, for example hydrochloric acid, is added after the reaction in order to liberate the amidylphthalic acid. Organic solvents which can be used are, above all, aprotic organic solvents. The use of such a solvent is frequently of advantage.

Examples of suitable aprotic organic solvents are: aliphatic or cycloaliphatic ketones, such as acetone, methyl ethyl ketone, cyclopentanone and cyclonexanone; cyclic ethers, such as tetrahydrofurane, tetrahydropyrane and dioxane; cyclic amides, such as N-methyl-2-pyrrolidone, N-acetyl-2-pyrrolidone and N-methyl-ε-caprolactam; N,N-dialkylamides of aliphatic monocarboxylic acids with 1-3 carbon atoms in the acid part, such as N,N-dimethylformamide, N,N-dimethylacetamide, N,N-diethylacetamide and N,N-dimethylmethoxyacetamide; alkyl esters of aliphatic monocarboxylic acids with a total of 2-6 carbon atoms, such as formic acid or acetic acid methyl, ethyl or n-butyl ester; hexamethylphosphoric acid triamide (hexametapol); N,N,N',N'-tetramethylurea; tetrahydrothiophene dioxide (sulpholane); and dialkyl sulphoxides, such as dimethylsulphoxide and diethylsulphoxide.

Mixtures of such solvents can also be employed. The preferred solvent is dioxane.

After completion of the reaction, the amidylphthalic acids of the formula III are isolated in the usual manner by filtration or stripping off the solvent and are purified if desired, for example, by washing with a suitable solvent, such as dioxane, diethyl ether, methylene chloride and chloroform, or by recrystallisation.

The cyclisation of the amidylphthalic acids of the formula III to give imidyl- or isoimidyl-phthalic anhydrides of the formula I can be carried out in a manner which is in itself known, either chemically, that is to say using dehydrating agents which are in themselves known for the formation of anhydrides and imides, and/or thermally.

The cyclisation to imidyl-phthalic anhydrides of the formula I, where X=oxygen, is in general carried out at temperatures between about 50° and 120° C., preferably 70°-90° C. by means of suitable dehydrating agents and optionally with the addition of a catalyst and/or in the presence of an aprotic organic solvent.

Possible dehydrating agents are, above all, anhydrides of aliphatic monocarboxylic acids with 2-5 carbon atoms which are optionally substituted by halogen atoms or alkyl radicals, such as acetic anhydride, propionic anhydride, butyric anhydride and valeric anhydride, trichloroacetic anhydride, trifluoroacetic anhydride, trimethylacetic anhydride, triethylacetic anhydride and tri-n-butylacetic anhydride.

Acetic anhydride is the preferred dehydrating agent.

Examples of catalysts which can be added to the above dehydrating agents are alkaline earth metal salts and alkali metal salts of aromatic monocarboxylic acids or of aliphatic monocarboxylic acids with 1-3 carbon atoms, such as sodium benzoate, sodium salicylate, calcium formate and sodium formate, calcium acetate, magnesium acetate, sodium acetate and potassium acetate and sodium propionate, bases, such as trimethylamine, triethylamine and pyridine, or nickel salts or nickel complexes, such as nickel-2 acetate or nickel acetylacetonate.

Preferred catalysts are sodium acetate, nickel-2 acetate, triethylamine and pyridine.

Depending on the nature of the amidylphthalic acid of the formula III which is to be cyclised, the conjoint use of an aprotic organic solvent, above all benzene or toluene, can be of advantage.

The cyclisation of imidylphthalic anhydrides of the formula I with X=oxygen can also be carried out thermally by heating to temperatures of about 100° C. to 150° C.

Since the thermal imidisation frequently takes place under milder conditions than the formation of the anhydride, it can at times be of advantage to stop the thermal cyclisation at the stage of the imidyl-phthalic acids. The anhydride formation can then be carried out in a known manner by means of anhydrides of aliphatic monocarboxylic acids of the type mentioned, particularly acetic anhydride, in which case it is usually possible to dispense with the abovementioned catalysts.

The cyclisation to imidyl-phthalic anhydrides of the formula I, where Y=oxygen, that is to say isoimidyl-phthalic anhydrides, is in general carried out at temperatures between about −20° C. and +100° C., preferably at temperatures between −10° C. and +30° C., in the presence of a dehydrating agent and optionally of a tertiary organic base and/or of an aprotic organic solvent. Tertiary organic bases are preferably employed together with an aprotic organic solvent. Examples of suitable bases of this type are trimethylamine, triethylamine, pyridine and dimethylaniline.

Examples of dehydrating agents which can be used in the above reaction are trifluoroacetic anhydride, heptafluorobutyric anhydride, dicyclohexylcarbodiimide, diisopropylcarbodiimide, and alkyl esters, with 1-5 carbon atoms, of chloroformic acid, such as chloroformic acid methyl ester, ethyl ester, isopropyl ester and isobutyl ester.

The following may be mentioned as further dehydrating agents which may be suitable: chlorides or anhydrides of aliphatic monocarboxylic acids with 1-3 carbon atoms, such as acetyl chloride and acetic anhydride, and thionyl chloride.

Preferred dehydrating agents for the manufacture of isoimidyl-phthalic anhydrides are trifluoroacetic anhydride, dicyclohexylcarbodiimide and chloroformic acid ethyl ester.

Suitable aprotic organic solvents which can be co-used in the cyclisation to isoimidyl-phthalic anhydrides are optionally halogenated aromatic and halogenated aliphatic hydrocarbons, such as benzene, toluene, chlorobenzene, chloroform, carbon tetrachloride and methylene chloride, as well as cyclic ethers, cyclic amides or N,N-dialkylamides of aliphatic monocarboxylic acids of the type mentioned in connection with the reaction of the aminophthalic acids with the anhydrides of the formula II.

The imidyl- and isoimidyl-phthalic anhydrides of the formula I are obtained in the form of colourless to pale yellowish crystals and can be isolated, and purified, in the usual manner, for example by extraction and/or recrystallisation from suitable organic solvents, such as benzene, glacial acetic acid, ethyl acetate, cyclohexane, dioxane or methylene chloride or mixtures of such solvents.

The imidyl- and isoimidyl-phthalic anhydrides of the formula I, according to the invention, are valuable curing agents for epoxide resins. Products or materials cured therewith are distinguished, compared to products or materials of analogous epoxide resins using known curing agents, by improved mechanical, thermal and/or electrical properties, above all a high heat distortion point coupled at the same time with good flexural strength, and by low dielectric loss factors at elevated temperatures. A particularly important advantage of the imidyl- and isoimidyl-phthalic anhydrides according to the invention is firstly that, in contrast to, say, phthalic anhydride, they do not sublime even at higher processing temperatures. Secondly, the curing reactions in part take place relatively slowly even at high temperatures if carried out without curing accelerators, and this is of advantage for some applications.

Hence, a further subject of the present invention are curable mixtures which are suitable for the production of shaped articles, impregnations, coatings, glue bonds and the like. They are characterised in that they contain (a) a polyepoxide compound and (b) as the curing agent, at least one imidyl- or isoimidyl-phthalic anhydride of the formula I.

Suitably, 0.5 to 1.5 mols, preferably about 0.9 to 1.0 mol, of an imidyl- or isoimidyl-phthalic anhydride of the formula I is used per 1 equivalent of epoxide group of the polyepoxide compound a).

The 3- and 4-(succinimidyl)-phthalic anhydrides are particularly suitable for the production of shaped articles having particularly high glass transition temperatures. The 3- and 4-(maleinimidyl)-phthalic anhydrides are distinguished by good compatibility with the customary epoxide resins.

Polyepoxide compounds (a) which can be used are all those which can be cured with anhydride curing agents. In particular, there may be mentioned: alicyclic polyepoxides, such as epoxyethyl-3,4-epoxycyclohexane (vinylcyclohexene diepoxide), limonene diepoxide, dicyclopentadiene diepoxide, bis-(3,4-epoxycyclohexylmethyl) adipate, (3',4'-epoxycyclohexylmethyl)-3,4-epoxycyclohexanecarboxylate, (3',4'-epoxy-6'-methylcyclohexylmethyl)-3,4-epoxy-6-methylcyclohexanecarboxylate, 3-(3',4'-epoxycyclohexyl)-2,4-dioxaspiro(5,5)-8,9-epoxyundecane, and 3-(glycidyloxy-ethoxyethyl)-2,4-dioxaspiro(5,5)-8,9-epoxyundecane; diglycidyl ethers or polyglycidyl ethers of polyhydric alcohols such as 1,4-butanediol or polyalkylene glycols, such as polypropylene glycols; diglycidyl ethers or polyglycidyl ethers of cycloaliphatic polyols, such as 2,2-bis-(4-hydroxycyclohexyl)-propane; diglycidyl ethers or polyglycidyl ethers of polyhydric phenols, such as resorcinol, bis-(p-hydroxyphenyl)-methane, 2,2-bis-(p-hydroxyphenyl)-propane (diomethane), 2,2-bis-(4'-hydroxy-3',5'-dibromophenyl)-propane, 1,1,2,2-tetrakis-(p-hydroxyphenyl)-ethane or condensation products of phenols with formaldehyde, obtained under acid conditions, such as phenol novolacs and cresol novolacs; also, di- or poly-(β-methylglycidyl) ethers of the abovementioned polyalcohols and polyphenols; polyglycidyl esters and poly-(β-methylglycidyl) esters of polybasic carboxylic acids, such as phthalic acid, terephthalic acid, tetrahydrophthalic acid and hexahydrophthalic acid; N-glycidyl derivatives of amines, amides and heterocyclic nitrogen bases, such as N,N-diglycidylaniline, N,N-diglycidyltoluidine, and N,N,N',N'-tetraglycidyl-bis-(p-aminophenyl)-methane; triglycidyl isocyanurate; N,N'-diglycidylethyleneurea; N,N'-diglycidyl-5,5-dimethylhydantoin and N,N'-diglycidyl-5-isopropylhydantoin; and, N,N'-diglycidyl-5,5-dimethyl-6-isopropyl-5,6-dihydrouracil.

If desired, active diluents, such as, for example, styrene oxide, butyl glycidyl ether, isooctyl glycidyl ether, phenyl glycidyl ether, cresyl glycidyl ether and glycidyl esters of synthetic highly branched, in the main tertiary aliphatic monocarboxylic acids can be added to the curable mixtures to lower the viscosity.

Furthermore, curing accelerators can be employed in the curing reaction; examples of such accelerators are tertiary amines, their salts or quaternary ammonium compounds, for example 2,4,6-tris-(dimethylaminomethyl)-phenol, benzyldimethylamine, 1-methylimidazole, 2-ethyl-4-methyl-imidazole, 4-aminopyridine and triamylammonium phenolate, or alkali metal alcoholates, such as, for example, sodium hexanetriolate. The curing of the mixtures, according to the invention, of an imidylphthalic anhydride of the formula I and the epoxide resin, is suitably carried out in the temperature range of 50° C.–250° C., preferably of 130°–220° C.

The curing reaction can also be carried out in a known manner in two or more stages, in which case the first curing stage is carried out at a lower temperature and the post-curing at a higher temperature.

If desired, the curing can also be carried out in two stages in such a way that the curing reaction is first prematurely discontinued or the first stage is carried out at a slightly elevated temperature, whereby a curable precondensate which is still fusible and/or soluble (a so-called "B-stage") is obtained from the epoxide component (a) and the curing agent (b). Such a precondensate can serve, for example, for the manufacture of "prepregs", compression moulding compositions or, especially, sintering powders.

The term "curing" as used here denotes the conversion of the soluble, either liquid or fusible polyepoxides into solid, insoluble and infusible, three-dimensionally crosslinked products or materials, as a rule with simultaneous shaping to give shaped articles, such as castings, pressings and laminates, or to give impregnations, coatings, lacquer films or adhesive bonds.

The curable mixtures according to the invention can also contain suitable plasticisers, such as dibutyl phthalate, dioctyl phthalate or tricresyl phosphate.

Furthermore, the curable mixtures according to the invention can be mixed, in any stage before curing, with extenders, fillers and reinforcing agents, such as, for example, coal tar, bitumen, textile fibres, glass fibres, asbestos fibres, boron fibres, carbon fibres, mineral silicates, mica, quartz flour, titanium dioxide, hydrated aluminium oxide, bentonites, kaolin, silica aerogel or metal powders, aluminium powder or iron powder, and also with pigments and dyestuffs, such as carbon black, oxide colours, titanium oxide and others. Furthermore, other customary additives, for example flameproofing agents, such as antimony trioxide, agents for conferring thixotropy and flow control agents, such as silicones, waxes or stearates (which in part are also used as mould release agents) can be added to the curable mixtures.

The curable mixtures according to the invention can be prepared in the usual manner with the aid of known mixing equipment (stirrers, kneaders, rolls and the like).

The curable epoxide resin mixtures according to the invention are employed above all in the fields of surface protection, the electrical industry, laminating processes and the building trade. They can be used, in a formulation suited in each case to the special application, in the unfilled or filled state, as paints, lacquers, compression moulding compositions, dipping resins, casting resins, injection moulding formulations, impregnating resins and adhesives, tool resins, laminating resins, mastics and surface-filling compositions, floor covering compositions and binders for mineral aggregates.

The following epoxide resin was use for the preparation of curable mixtures described in the use examples:

EPOXIDE RESIN A

An epoxide resin (technical product) which is manufactured by condensation of 2,2-bis-(p-hydroxyphenyl)-propane with a stoichiometric excess of epichlorohydrin in the presence of alkali, consists in the main of monomeric diglycidyl ether of the formula

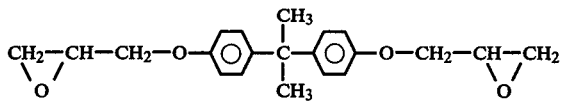

is liquid at room temperature, and has an epoxide content of 5.12–5.54 epoxide equivalents/kg and a viscosity (Hoeppler) of 9,000–13,000 cP at 25° C.

To determine the mechanical properties of the curable mixtures described in the examples which follow, sheets 4 mm thick were produced. The test specimens for determining the heat distortion point according to ISO/R 75 (DIN 53,461), the flexural strength and the deflection according to VSM 77,103, and the water absorption, were machined from the sheets.

Sheets 2 mm thick were produced for determining the electrical properties (dielectric loss factor according to DIN 53,483, dielectric constant according to DIN 53,483 and specific volume resistance according to DIN 53,482).

A. MANUFACTURING EXAMPLES

Example 1

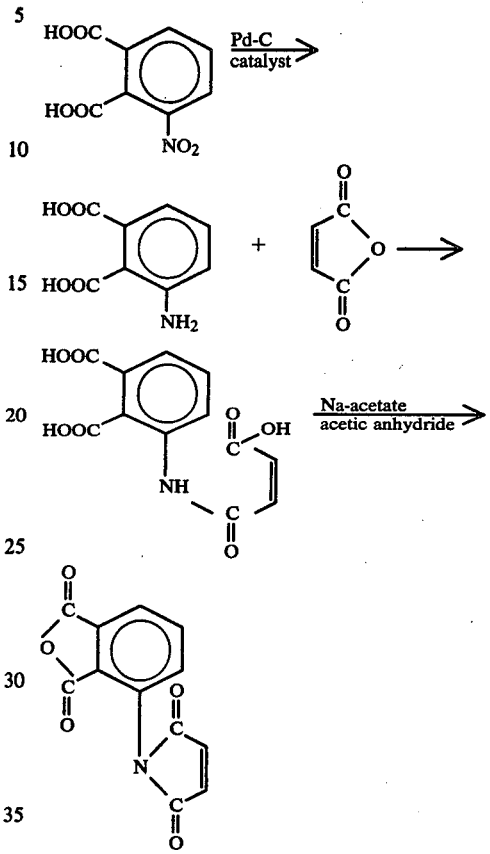

84.5 g (0.4 mol) of 3-nitrophthalic acid are hydrogenated in 250 ml of dioxane in the presence of 4 g of a palladium/charcoal catalyst containing 5% by weight of palladium, at 25° C. The reaction solution is filtered and 47.02 g (0.48 mol) of maleic anhydride are then added. The reaction mixture is kept at room temperature for 12 hours (approx. 20°–25° C.).

After this time, 105 g (94% of theory) of 3-(maleinamidyl)-phthalic acid crystallise out. This acid is filtered off, washed with 20 ml of dioxane, suction-drained, pressed and sucked dry.

111.68 g (0.4 mol) of the above 3-(maleinamidyl)-phthalic acid are mixed with 26 g of anhydrous sodium acetate, 165 ml of acetic anhydride and 800 ml of benzene and the mixture is heated to 80° C. for 3 hours, whilst stirring. The resulting solution is freed from the sodium acetate by filtration, and freed from the benzene in vacuo. After drying the crystalline residue at 60° C./0.05 mm Hg, 82.7 g (85% of theory) of 3-(maleinimidyl)-phthalic anhydride are obtained; melting point 167°–169° C.

NMR spectrum (CDCl$_3$): δ=7.27 ppm (methine protons).

Analysis for C$_{12}$H$_5$NO$_5$ (molecular weight 243.16): Calculated: C 59.3%; H 2.1%; N 5.8%. Found: C 59.2%; H 2.0%; N 5.8%.

3-(Maleinamidyl)-phthalic acid, manufactured in accordance with the above example, can also be converted into 2-(maleinimidyl)-phthalic anhydride by the following method: the solid 3-(maleinamidyl)-phthalic acid is first heated for approx. 12 hours at approx. 110°

C./100 mm Hg, whereby it is converted into 3-(maleinimidyl)-phthalic acid (melting point: 130°–132° C.). The latter can be converted by means of acetic anhydride into 3-(maleinimidyl)-phthalic anhydride in about 90% yield, melting point 167°–169° C.

Example 2

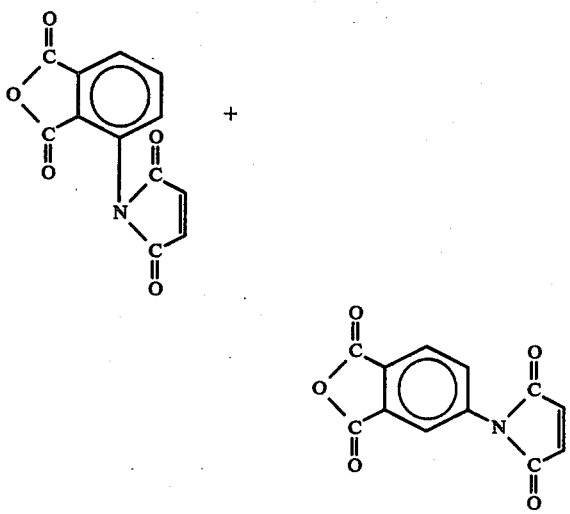

(a) A mixture of 36.25 g (0.2 mol) each of 3- and 4-nitrophthalic acid is hydrogenated catalytically in the manner described in Example 1 and then reacted with 47.02 g (0.48 mol) of maleic anhydride. 87 g (78% of theory) of a mixture of 3- and 4-(maleinamidyl)-phthalic acid are obtained. 0.4 mol of this mixture is worked up in the manner described in Example 1. 77.7 g (80% of theory) of a mixture of 3- and 4-(maleinimidyl)-phthalic anhydride are obtained; melting point 117°–130° C. NMR spectrum (CDCl$_3$): $\delta = 7.27$ and 7.2 ppm (methine protons).

Analysis for C$_{12}$H$_5$NO$_5$ (molecular weight 243.16):
Calculated: C 59.31%; H 2.1%; N 5.8%. Found: C 59.0%; H 2.3%; N 5.7%.

(b) A mixture of 21.1 g (0.1 mol) of 3- and 4-nitrophthalic acid ($\approx$1:1) is dissolved in 140 ml of water which contains one equivalent of sodium hydroxide solution and is hydrogenated in the presence of 2 g of palladium/charcoal catalyst, containing 5% by weight of palladium.

10.29 g (0.15 mol) of maleic anhydride are added to the filtered reaction solution and the mixture is stirred for 3 hours at room temperature. The reaction mixture, which has turned greenish, is evaporated to dryness, 41 ml of acetic anhydride are added, and the whole is heated to 80° C. for 30 minutes and again evaporated to dryness. The residue is heated to 100° C. with 100 ml of toluene, the resulting solution is filtered hot to remove the insoluble constituent, and the filtrate is heated with 2 ml of thionyl chloride to 80° C. for 1 hour. After cooling, 2 g of animal charcoal are stirred into the solution and the latter is filtered off, concentrated to dryness and post-dried for 25 hours at 95° C./0.05 mm Hg. 18.3 g (75%) of a mixture of 3- and 4-(maleinimidyl)-phthalic anhydride are obtained in the form of a glassy, brittle substance which melts at between 90° and 118° C.

Found C 59.2%; H 2.4%; N 5.9%.

Example 3

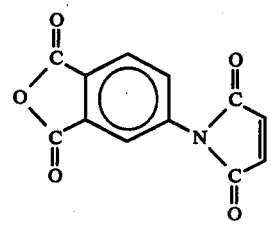

84.5 g (0.4 mol) of 4-nitrophthalic acid are hydrogenated in 720 ml of dioxane, in the presence of 4 g of a palladium/charcoal catalyst containing 5% by weight of palladium, at 25° C. 47.02 g (0.48 mol) of maleic anhydride are added to the filtered reaction solution. After a reaction time of 12 hours, the 4-(maleinamidyl)-phthalic acid which has precipitated is filtered off and washed with 50 ml of dioxane. After drying at 80° C./15 mm Hg for 12 hours, 101.6 g (91% of theory) of 4-maleinamidyl)-phthalic acid are obtained.

111.68 g (0.4 mol) of this 4-(maleinamidyl)-phthalic acid are mixed with 26 g of anhydrous sodium acetate and 170 ml of acetic anhydride and the mixture is heated to 80° C. for 30 minutes, whilst stirring. The resulting solution is evaporated to dryness and post-dried at 60° C./0.1 mm Hg. The residue is extracted with 2,000 ml of benzene in a hot extractor. The benzene solution is concentrated to dryness and the residue is post-dried for 35 hours at 60° C./0.05 mm Hg. 77.7 g (80% of theory) of crystalline 4-(maleinimidyl)-phthalic anhydride are obtained; melting point 173°–175° C.; NMR spectrum (CDCl$_3$): $\delta = 7.2$ ppm (methine protons).

Analysis for C$_{12}$H$_5$NO$_5$ (molecular weight 243.16):
Calculated: C 59.3%; H 2.1%; N 5.8%. Found: C 59.3%; H 2.2%; N 5.7%.

Example 4

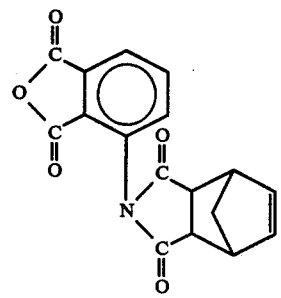

21.1 g (0.1 mol) of 3-nitrophthalic acid are hydrogenated to 3-aminophthalic acid in the manner described in Example 1, in 65 ml of dioxane, in the presence of 1 g of a palladium/charcoal catalyst containing 5% by weight of palladium. The solution is filtered and 16.4 g (0.1 mol) of bicyclo[1.2.2]hept-5-ene-2,3-dicarboxylic anhydride (nadic anydride) are added. The reaction mixture is kept for 36 hours at 25° C. and is then concentrated in vacuo. The resulting oily residue is mixed with 150 ml of methylene chloride and the mixture is left to stand for approx. 12 hours. The crystals which have precipitated are then filtered off and washed with 20 ml of methylene chloride. 24.15 g (70% of theory) of 3-(bicyclo[1.2.2]hept-5-ene-2,3-dicarboxylic acid amidyl)-phthalic acid are obtained.

13.8 g (0.04 mol) of this amidylphthalic acid are mixed with 1.4 g of anhydrous sodium acetate and 25 ml of acetic anhydride and the mixture is heated to 80° C. for 30 minutes, whilst stirring. The resulting reaction solution is evaporated to dryness, the residue is extracted with 60 ml of hot benzene and the benzene solution is filtered using animal charcoal. After evaporating the benzene, the residue is dried for 24 hours at 60° C./0.05 mm Hg. 9.95 g (80% theory) of crystalline 3-(bicyclo[1.2.2]hept-5-ene-2,3-dicarboxylic acid imidyl)-phthalic anhydride are obtained; melting point 178°–180° C.

Analysis for $C_{17}H_{11}NO_5$ (molecular weight 309.28): Calculated: C 66.0%; H 3.6%; N 4.5%. Found: C 66.2%; H 3.5%; N 4.5%.

Example 5

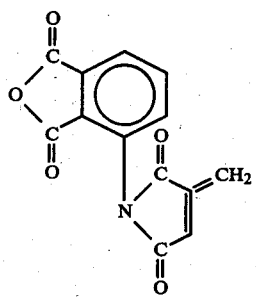

105.6 g (0.5 mol) of 3-nitrophthalic acid are hydrogenated in 315 ml of dioxane in the presence of 4 g of a palladium/charcoal catalyst containing 5% by weight of palladium. 67.2 g (0.6 mol) of itaconic anhydride are added to the filtered reaction solution and the mixture is left to stand for 12 hours at 25° C. and is then concentrated in a waterpump vacuum at 60° C./15 mm Hg. The resulting viscous pale yellow residue is stirred with 200 ml of diethyl ether until it has been converted to a pale yellow suspension. This is filtered and the residue is washed with 20 ml of diethyl ether and dried for 12 hours at 80° C./15 mm Hg. 95.8 g (65.6% of theory) of 3-(itaconamidyl)-phthalic acid are obtained.

Without purifying it further, 58.6 g (0.2 mol) of this 3-itaconamidyl)-phthalic acid in 240 ml of acetic anhydride are heated to 115° C. over the course of 4 hours. The resulting solution is evaporated in vacuo at 14 mm Hg, the residue is dissolved in 400 ml of benzene and the solution is filtered cold and evaporated in vacuo. The residue is dissolved in 500 ml of ethyl acetate. After adding animal charcoal and 200 ml of cyclohexane, the solution is filtered. 450 ml of cyclohexane are added to the filtrate. The resulting suspension is stirred for 12 hours at 25° C. and the reaction product is filtered off and dried at 80° C./0.5 mm Hg. 32 g (62.2% of theory) of 3-(itaconimidyl)-phthalic anhydride are obtained, of which the melting point, after recrystallisation from a mixture of 500 ml of ethyl acetate and 500 ml of cyclohexane, is 171°–173° C.

Analysis for $C_{13}H_7NO_5$ (molecular weight 257.21): Calculated: C 60.7%; H 2.7%; N 5.5%. Found: C 60.9%; H 2.8%; N 5.5%.

Example 6

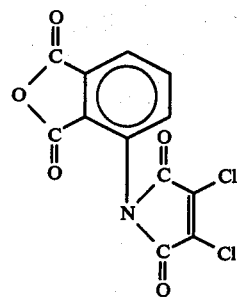

20 g (0.12 mol) of 2,3-dichloromaleic anhydride are added to a solution of 18.1 g (0.1 mol) of 3-aminophthalic acid in 90 ml of dioxane. The reaction mixture is stirred at 20°–30° C., whereupon a clear solution is produced over the course of approx. 30 minutes. The dioxane is then distilled off in vacuo (20 mm Hg) and the oil which remains is warmed to 130° C. After 3 hours, the crystalline mass is cooled to 50° C. and mixed with 100 ml of ethyl acetate. The reaction product is filtered off at 10° C. and dried in vacuo at 80° C. 18.1 g (58% of theory) of crystalline 3-(2',3'-dichloromaleinimidyl)-phthalic anhydride are obtained, melting at 229°–230° C. after recrystallisation from anhydrous acetic acid.

Analysis for $C_{12}H_3Cl_2NO_5$ (molecular weight 312.06): Calculated: C 46.2%; H 0.96%; N 4.5%; Cl 22.75%. Found: C 45.84%; H 1.09%; N 4.44%; Cl 22.42%.

Example 7

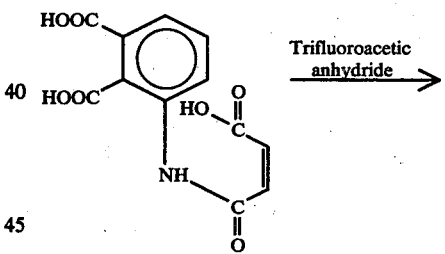

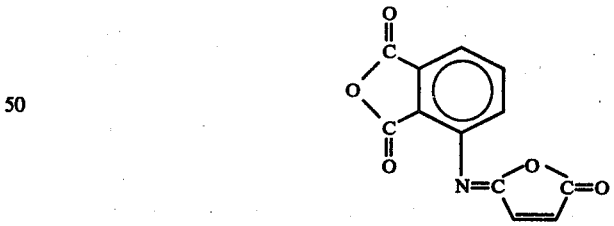

33.0 g (0.12 mol) of the 3-maleinamidyl)-phthalic acid manufactured according to Example 1, paragraph 1, are suspended in 290 ml of anhydrous benzene and 38.2 ml of trifluoroacetic anhydride are added. The resulting suspension is stirred, with exclusion of atmospheric moisture, for 2 hours at 20°–25° C. until a clear solution is produced, which is then concentrated to dryness at 40° C. on a rotary evaporator. The residue is suspended in 100 ml of anhydrous benzene, the mixture is filtered and the filter residue is dried for 1 hour under a high vacuum. 22.4 g (92% of theory) of crude 3-(isomaleinimidyl)-phthalic anhydride are obtained. This is recrystallised in a mixture of 540 ml of ethyl acetate and 1,500 ml of cyclohexane in the presence of 10 g of active charcoal and then dried in a high vacuum. 15.4 g (53% of theory) of pure 3-)isomaleinimidyl)-phthalic anhydride are obtained in the form of colourless crystals.

Analysis for $C_{12}H_5NO_5$ (molecular weight 243.18): Calculated: C 59.3%; H 2.1%; N 5.8%. Found: C 59.2%; H 2.0%; N 5.8%.

Example 8

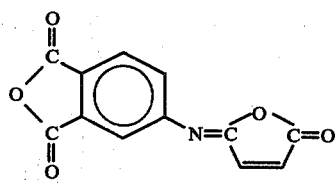

22.4 g (0.08 mol) of the 4-(maleinamidyl)-phthalic acid manufactured according to Example 3, paragraph 1, are suspended in 150 ml of anhydrous methylene chloride and 37.8 ml of trifluoroacetic anhydride are added. The reaction mixture is stirred for 2 hours at 20°–25° C., whilst excluding atmospheric moisture. 30.5 g of pyridine are then added dropwise whilst cooling with ice (internal temperature 20°–25° C.). The reaction mixture is then stirred for a further 2 hours at 20°–25° C. and filtered, and the filter residue is washed with a little methylene chloride and dried under a high vacuum. 14.7 g (75% of theory) of 4-isomaleinimidyl)-phthalic anhydride are obtained in the form of slightly yellowish crystals; decomposition at 195°–207° C.

Analysis for $C_{12}H_5NO_5$ (molecular weight 243.18): Calculated: C 59.3%; H 2.1%; N 5.8%. Found: C 59.2%; N 2.0%; N 5.8%.

Example 9

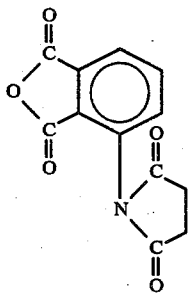

69.1 g (0.69 mol) of succinic anhydride are added to a solution of 119.5 g (0.66 mol) of 3-aminophthalic acid in 500 ml of dioxane whilst stirring at 20°–25° C.; the anhydride dissolves over the course of about one hour. After 2 hours, the 3-(succinamidyl)-phthalic acid formed begins to precipitate. The reaction mixture is left to stand for a further 20 hours at 20°–25° C., after which the 3-(succinamidyl)-phthalic acid is filtered off. A mixture of 81.8 g (0.81 mol) of acetic anhydride and 71 g (0.9 mol) of pyridine is added to the filter residue at 20° C., whereupon a clear solution results. This solution is warmed to 80° C. over the course of 2 hours, whereupon 3-(succinimidyl)-phthalic anhydride precipitates in a crystalline form; the anhydride is washed with a little dioxane and benzene and dried to constant weight. 95.5 g (65% of theory) of 3-(succinimidyl)-phthalic anhydride of melting point 202°–205° C. are obtained.

Analysis for $C_{12}H_7NO_5$ (molecular weight 245.2): Calculated: C 58.8%; H 2.9%; N 5.7%. Found: C 58.7%; H 3.0%; N 5.8%.

Further 3-(succinamidyl)-phthalic acid can be isolated by concentrating the dioxane filtrate to about 200 ml, and this acid is also cyclised to 3-(succinimidyl)-phthalic anhydride by means of pyridine/acetic anhydride. Yield 13.5 g, which corresponds to a total yield of 109 g. (approx. 90% of theory).

Example 10

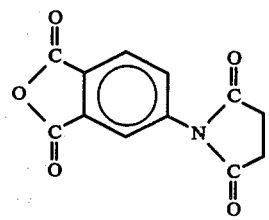

65.1 g (0.36 mol) of 4-aminophthalic acid in 500 ml of dioxane are reacted with 37.8 g (0.38 mol) of succinic anhydride, in the manner described in Example 9, to give 4-(succinamidyl)-phthalic acid, and the latter is subsequently cyclised. 66 g (77% of theory) of 4-(succinimidyl)-phthalic anhydride of melting point 228°–230° C. are obtained.

Analysis for $C_{12}H_7NO_5$ (molecular weight 245.2): Calculated: C 58.8%; H 2.9%; N 5.7%. Found: C 58.8%; H 3.0%; N 5.8%.

Example 11

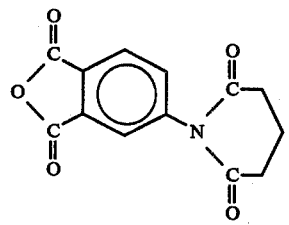

65.1 g (0.36 mol) of 4-aminophthalic acid in 500 ml of dioxane are reacted with 43.12 g (0.38 mol) of glutaric anhydride, in the manner described in Example 9, to give 4-glutaramidyl)-phthalic acid, and the latter is subsequently cyclised. 70 g (75% of theory) of 4-(glutarimidyl)-phthalic anhydride of melting point 220°–222° C. are obtained.

Analysis for $C_{13}H_9NO_5$ (molecular weight 259.2): Calculated: C 60.2%; H 3.5%; N 5.4%. Found: C 60.1%; H 3.6&; N 5.5%.

Example 12

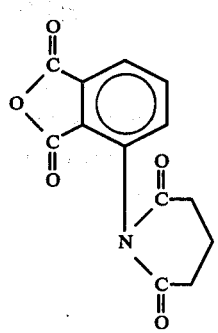

119.5 g (0.66 mol) of 3-aminophthalic acid in 500 ml of dioxane are reacted with 80.1 g (0.7 mol) of glutaric annydride in the manner described in Example 9, to give 3-(glutaramidyl)-phthalic acid, and the latter is subsequently cyclised. 125.4 g (81% of theory) of 3-(glutarimidyl)-phthalic anhydride of melting point 234°–236° C. are obtained.

Analysis for $C_{13}H_9NO_5$ (molecular weight 259.2): Calculated: C 60.2%; H 3.5%; N 5.4%. Found: C 60.2%; H 3.6%; N 5.4%.

EXAMPLE 13

5 ml of toluene and 12.6 g (0.1 mol) of dimethylmaleic anhydride are added to a solution of 22.5 g (0.1 mol) of the disodium salt of 3-aminophthalic acid in 20 ml of water. The mixture is heated to 90°–95° C. and is left at this temperature for 30 minutes whilst stirring. The reaction mixture is then cooled to 20° C., 60 ml of 10% strength hydrochloric acid are added and the 3-(dimethylmaleinimidyl)-phthalic acid which has precipitated is filtered off. The crude product is recrystallised from water and suction-dried. Yield: 80% of theory=23.1 g. To convert it to the anhydride, 87 ml of acetic anhydride are poured over 28.9 g (0.1 mol) of the 3-(dimethylmaleinimidyl)-phthalic acid and the mixture is heated to 130° C. A solution is produced, which is kept at 130° C. for 10 minutes. Excess acetic anhydride and acetic acid are then distilled off under reduced pressure. The residue is purified by recrystallisation from toluene.

Yield: 19.8 g=73.1% of theory, melting point=167° C. Analysis for $C_{14}H_9NO_5$ (molecular weight 271.23) Calculated: C 62.0%; H 3.3%; N 5.2%. Found: C 62.0%; H 3.5%; N 5.1%.

If instead of 22.5 g of the disodium salt of 3-aminophthalic acid, an equivalent amount of the disodium salt of 4-aminophthalic acid is employed and in other respects the procedure indicated in the above example is followed, 4-(di-methylmaleinimidyl)-phthalic anhydride of melting point 197° C. is obtained.

EXAMPLE 14

124.9 g (0.69 mol) of 4-aminophthalic acid freshly obtained by reduction of 4-nitrophthalic acid in dioxane are reacted with 109.8 g (0.72 mol) of cis-1,2,3,6-tetrahydrophthalic anhydride in the manner described in Example 9, and the product is worked up as follows: after the batch has stood for 20 hours, the clear reaction solution is concentrated in vacuo to approx. 200 ml and heated with 200 ml of acetic anhydride and 170 ml of pyridine to 60° C. for 10 hours. The solvents are then stripped off in vacuo and the solid residue is recrystallised from benzene, whereupon the yellow-coloured phthalic anhydride derivative is obtained in a yield of about 50%, melting point=188° C.

Analysis for $C_{16}H_{11}NO_5$ (molecular weight 297.7) Calculated: C 64.64% H 3.70% N 4.71% Found: C 64.2% H 3.7% N 4.8%

The 3-isomer, which melts at 110° C., is also obtained analogously, in about 78% yield:
Found: C 65.0%; H 3.7%; N 4.8%.

B. USE EXAMPLES

EXAMPLE I 19.50 g of epoxide resin A (epoxide content 5.12 epoxide equivalents/kg) and 21.90 g of the 3-(maleinimidyl)-phthalic anhydride manufactured according to Example 1 (corresponding to 0.9 mol of the anhydride per 1 equivalent of epoxide groups) are mixed and the mixture is warmed to 160° C. over the course of 15 minutes, whilst stirring. This produces a clear solution, which is poured into an aluminium mould, pre-warmed to 150° C., to produce sheets 4 mm and 2 mm thick. The mixture is cured in a circulating air oven, initially for 3 hours at 150° C. and then for 5 hours at 220° C. Transparent, bubble-free castings are produced.

EXAMPLE II

Analogously to the description in Example 1, 19.50 g of epoxide resin A (epoxide content 5.12 epoxide equivalents/kg) and 21.90 g of the 4-maleinimidyl)-phthalic anhydride manufactured according to Example 3 (corresponding to 0.9 mol of the anhydride per 1 equivalent of epoxide groups) are mixed and converted to transparent, bubble-free castings.

EXAMPLE III 19.50 g of epoxide resin A (epoxide content 5.12 epoxide equivalents/kg) and 21.90 g of a 1:1 mixture of 3-(maleinimidyl)-phthalic anhydride and 4-(maleinimidyl)-phthalic anhydride, manufactured according to Example 2 (corresponding to 0.9 mol of anhydride per 1 equivalent of epoxide groups) are mixed and warmed to 135° C. over the course of 15 minutes, whilst stirring. A clear solution results, which is converted analogously to Example I to transparent, bubble-free castings.

EXAMPLE IV 6.80 g of epoxide resin A (epoxide content 5.12 epoxide equivalents/kg) and 7.67 g of 3-(isomaleinimidyl)-phthalic anhydride manufactured according to Example 7 (corresponding to 0.9 mol of the anhydride per 1 equivalent of epoxide groups) are mixed and warmed to 150° C. over the course of 10 minutes, whilst stirring. A clear solution results, which is poured into an aluminium mould, prewarmed to 150° C., to produce sheets of 4 and 2 mm thickness. The curing is carried out as indicated in Example I.

EXAMPLE V 7.20 g of epoxide resin A (epoxide content 5.54 epoxide equivalents/kg) and 8.84 g of 3-(succinimidyl)-phthalic anhydride manufactured according to Example 9 (corresponding to 0.9 mol of the anhydride per 1 equivalent of epoxide groups) are mixed and warmed to 200° C. over the course of 10 minutes, whilst stirring. The resulting solution is rapidly poured into an aluminium mould prewarmed to 200° C. Curing is carried out in a circulating air oven, initially for 2 hours at 200° C. and then for 5 hours at 220° C.

EXAMPLE VI 10.95 g of 4-(maleinimidyl)-phthalic anhydride, manufactured according to Example 3, are dissolved in 31 g of cyclohexanone whilst warming. After cooling, 9.75 g of epoxide resin A (epoxide content 5.12 epoxide equivalents/kg; 0.9 mol of the anhydride per 1 equivalent of epoxide groups) are added to this solution. Glass fibre fabrics, for example so-called E-glass having an aminosilane finish, is impregnated with this solution by repeatedly drawing the fabric through it, and is then dried, and pre-cured, over the course of 45 minutes in a drying cabinet at 145° C./20 mm Hg. Several of the prepregs thus obtained are stacked one above the other the other and pressed in a platen press, to give laminates, under the following conditions: initially for 5 minutes at 150° C. under contact pressure, then for 2 hours at 150 ° C. under a pressure of 125 kp/cm² and finally for 5 hours at 210° C. under a pressure of 125 kp/cm². Well-bonded, bubble-free laminates are obtained.

COMPARISON EXAMPLES
EXAMPLE VII

A known casting resin mixture of 25 g of epoxide resin A (epoxide content 5.12 epoxide equivalents/kg) and 17 g of phthalic anhydride (corresponding to 0.9 mol of the anhydride per 1 equivalent of epoxide groups) is converted to a casting in the manner described in Example III.

EXAMPLE VIII

A known casting resin mixture of 45 g of epoxide resin A (epoxide content 5.2 epoxide equivalents/kg) and 24.5 g of maleic anhydride (corresponding to 1 mol of the anhydride per 1 equivalent of epoxide groups) is converted to a casting in the manner described in Example III.

The cured castings obtained according to the above Examples I–V, VII and VIII are summarised in Table I which follows. This shows that the castings manufactured with the curing agents according to the invention have a substantially higher heat distortion point and significantly better electrical properties at elevated temperatures.

EXAMPLE IX 9.70 g of epoxide resin A (epoxide content 5.16 epoxide equivalents/kg) and 13.35 g of the phthalic anhydride derivative manufactured according to Example 14 (corresponding to 0.9 mol of the anhydride per 1 equivalent of epoxide groups) are mixed and warmed at 125° C. for 10 minutes whilst stirring. A clear solution results, which is converted to transparent castings analogously to Example I. The dielectric loss factor according to DIN 53,483 (tgδ) at 180° C. (50 Hz) is 0.012 and the dielectric constant at 180° C. is 4.0.

What we claim is:

1. A curable mixture which is suitable for the manufacture moldings, impregnations, coatings and adhesive bonds comprising:
   (a) an epoxide compound containing at least two epoxide groups per molecule; and
   (b) a curing agent selected from the group consisting of compounds with at least one imidyl-phthalic anhydride of the formula

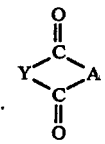

wherein Y represents the divalent radical

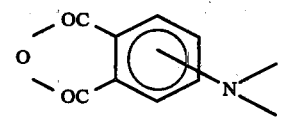

and A represents a divalent radical selected from the group consisting of

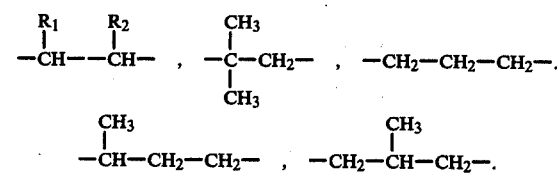

Table I

| Mechanical/electrical properties | Castings according to | | | | | | |
| --- | --- | --- | --- | --- | --- | --- | --- |
| | Example I | Example II | Example III | Example IV | Example V | Comparison example VII | Comparison example VIII |
| Heat distortion point according to ISO/R 75 (= DIN 53,461), °C. | 204 | 199 | 194 | 248 | 221 | 153 | 151 |
| Flexural strength according to VSM 77,103, kg/mm² | 12 | 11 | 13 | — | — | 16 | 11 |
| Deflection according to VSM77,103, mm | 5 | 3 | 5 | — | — | 10 | 6 |
| Water absorption (per cent by weight) | | | | | | | |
| 1 hour/100° C. | 0.46 | 0.45 | 0.33 | — | — | — | 0.32 |
| 4 days/23° C. | 0.74 | 0.60 | — | — | — | 0.28 | 0.33 |
| Dielectric loss factor according to DIN 53,483 (tgδ) at 180° C., 50 Hz | 0.008 | 0.034 | 0.016 | — | — | 0.073 | 0.06 |
| Dielectric constant according to DIN 53,483 (ε) at 180° C. | 4.3 | 4.4 | 4.1 | — | — | 5.9 | 5.0 |
| Specific volume resistance (Ω × cm) according to DIN 53,482 at 180° C. | $2 \times 10^{13}$ | $2 \times 10^{12}$ | $5 \times 10^{12}$ | — | — | $3 \times 10^{12}$ | $4 \times 10^{11}$ |

ISO/R = International Standards Organization/Recommendations
VSM = Verein Schweizerischer Maschinenindustrieller
DIN = Deutsche Industrie Norm -continued

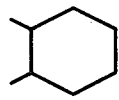,

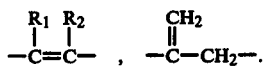

,

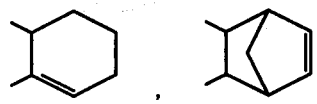,

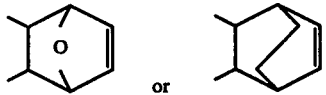
or $R_1$ and $R_2$ independently of one another denote hydrogen, chlorine, bromine or methyl, or compounds with at least one isoimidyl-phthalic anhydride of the formula

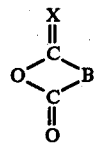 (I)

wherein X represents the divalent radical

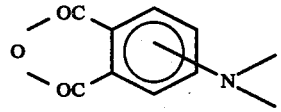

and B represents a divalent radical selected from the group consisting of

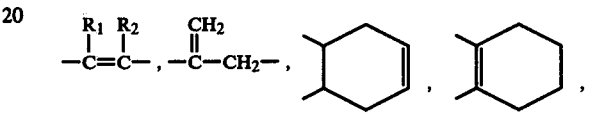

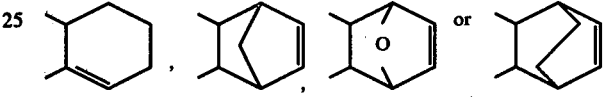

where $R_1$ and $R_2$ independently of one another denote hydrogen, chlorine, bromine or methyl.

2. A curable mixture according to claim 1 wherein 0.5 to 1.5 mols of curing agent (b) is used per 1 equivalent of epoxide group of epoxide compound (a).

3. A curable mixture according to claim 1 which further comprises a curing accelerator.

* * * * *